(12) United States Patent
Ahlgren et al.

(10) Patent No.: US 11,373,200 B2
(45) Date of Patent: Jun. 28, 2022

(54) CURRENT VALUE ESTIMATION USING MACHINE LEARNING

(71) Applicant: RITEBAND AB, Stockholm (SE)

(72) Inventors: Niklas Ahlgren, Stockholm (SE);
Linda Portnoff, Stockholm (SE);
Pontus Thorsson, Stockholm (SE);
Tone Pedersen, Solna (SE)

(73) Assignee: RITEBAND AB, Stockholm (SE)

( * ) Notice: Subject to any disclaimer, the term of this patent is extended or adjusted under 35 U.S.C. 154(b) by 0 days.

(21) Appl. No.: 17/056,381

(22) PCT Filed: Jun. 20, 2019

(86) PCT No.: PCT/US2019/038132
§ 371 (c)(1),
(2) Date: Nov. 17, 2020

(87) PCT Pub. No.: WO2019/246341
PCT Pub. Date: Dec. 26, 2019

(65) Prior Publication Data
US 2021/0201339 A1    Jul. 1, 2021

(30) Foreign Application Priority Data
Jun. 21, 2018    (SE) .................................... 1850777-2

(51) Int. Cl.
*G06Q 30/02*      (2012.01)
*G06N 20/00*      (2019.01)
(52) U.S. Cl.
CPC ......... *G06Q 30/0206* (2013.01); *G06N 20/00* (2019.01)
(58) Field of Classification Search
CPC .......................... G06Q 30/0206; G06N 20/00
(Continued)

(56) References Cited

U.S. PATENT DOCUMENTS

| 7,962,511 B2* | 6/2011 | Barney | G06Q 40/06 707/776 |
| 8,005,748 B2* | 8/2011 | Newman | G06Q 40/04 705/37 |

(Continued)

FOREIGN PATENT DOCUMENTS

JP         2018025851 A      2/2018
WO    WO 2008/130398 A1    10/2008
(Continued)

OTHER PUBLICATIONS

Chih-Fong Tsai, Yu-Hsin Lu, David C. Yen, "Determinants of intangible assets value: The data mining approach, Knowledge-Based Systems", vol. 31, 2012, pp. 67-77, ISSN 0950-7051. (Year: 2012).*

(Continued)

*Primary Examiner* — Charles Guiliano
*Assistant Examiner* — Letoria G Knight
(74) *Attorney, Agent, or Firm* — James S. Keddie; Bozicevic, Field & Francis LLP

(57) ABSTRACT

There is provided a system, method and computer program product for estimating a current value of an intangible asset, by obtaining a source file representing the intangible asset; analyzing the source file to identify at least one characteristic; classifying the source file to belong to at least one class based on the identified at least one characteristic; obtaining one or more evaluation parameters associated with the creator of the intangible asset from at least one first data source; obtaining any historical values associated with the intangible asset; predicting, using a machine learning model, a future value of the intangible asset based on the selected at least one class; the one or more evaluation parameter; and any obtained historical value; and estimating, by the machine learning model, the current value of the intangible (Continued)

asset based on the predicted future value and a pre-set time period.

13 Claims, 6 Drawing Sheets

(58) Field of Classification Search
USPC .................................................... 705/7.35
See application file for complete search history.

(56) References Cited

U.S. PATENT DOCUMENTS

| | | | | |
|---|---|---|---|---|
| 8,214,272 | B2* | 7/2012 | Glassman | G06Q 30/02 |
| | | | | 709/224 |
| 9,805,411 | B1 | 10/2017 | Parihar et al. | |
| 2002/0099637 | A1 | 7/2002 | Wilkinson et al. | |
| 2005/0021434 | A1* | 1/2005 | D'Loren | G06Q 40/06 |
| | | | | 705/36 R |
| 2008/0109297 | A1* | 5/2008 | Leach | G06Q 30/08 |
| | | | | 705/7.31 |
| 2008/0189217 | A1 | 8/2008 | Jhunjhunwala | |
| 2009/0240557 | A1 | 9/2009 | Hummel | |
| 2010/0257089 | A1* | 10/2010 | Johnson | G06Q 40/04 |
| | | | | 705/37 |
| 2013/0073439 | A1 | 3/2013 | Porwal et al. | |
| 2014/0297563 | A1* | 10/2014 | Jhunjhunwala | G06Q 40/02 |
| | | | | 705/36 R |
| 2015/0161636 | A1 | 6/2015 | Williams et al. | |
| 2015/0379427 | A1 | 12/2015 | Dirac et al. | |
| 2016/0093000 | A1* | 3/2016 | Pevzner | G06F 16/50 |
| | | | | 705/306 |
| 2018/0330281 | A1* | 11/2018 | Teller | G06N 20/00 |
| 2019/0066219 | A1* | 2/2019 | Ouderkirk | G06Q 40/06 |
| 2019/0205467 | A1* | 7/2019 | Wold | G06Q 50/184 |
| 2019/0325524 | A1* | 10/2019 | Gebara | G06Q 10/06375 |
| 2020/0210907 | A1* | 7/2020 | Ulizio | G06F 17/11 |

FOREIGN PATENT DOCUMENTS

| | | |
|---|---|---|
| WO | WO 2010/132840 A1 | 11/2010 |
| WO | WO 2016/191396 A1 | 12/2016 |

OTHER PUBLICATIONS

Yang et al., "Revisiting the Problem of Audio-Based Hit Song Prediction Using Convolutional Neural Networks", IEEE International Conference on Acoustics, Speech and Signal Processing (ICASSP), IEEE, 2017, pp. 621-625.

* cited by examiner

CURRENT VALUE ESTIMATION USING MACHINE LEARNING

CROSS-REFERENCE TO RELATED APPLICATIONS

This application is a § 371 national phase of International Application No. PCT/US2019/038132, filed on Jun. 20, 2019, which claims the benefit of Swedish Patent Application No. 1850777-2, filed on Jun. 21, 2018, which applications are incorporated by reference herein.

TECHNICAL FIELD

The present disclosure relates to a system, method and computer program product for estimating a current value of an intangible asset using a digital representation of the intangible asset to predict a future value for a pre-set time period.

BACKGROUND

Today, the music industry is growing on a yearly basis. The Swedish music industry, which is a frontrunner economy, has grown 50 percent over the last six years, and according to a recent Goldman Sach's report, the global music industry is estimated to grow to $104 billion over the coming 15 years. But for many artists, financing is still a struggle. This is because the music industry is a 'winner-take-it-all' or a so called 'superstar economy' which means that a minority of hits represents the lion's share of industry's revenue. In addition, it can take a long time to reach commercial success.

In every country there are collecting societies that ensure organizations such as media, cinema, restaurants, and bars etc. who wish to use copyrighted works publicly in locations such as shopping and dining venues pay for the music they use by issuing licenses. A collecting society may also be referred to as a performance rights organization (PRO), performing rights society, or a Collective Management Organization (CMO), or, in some countries, copyright collectives or copyright collecting agencies. When works are performed publicly or recorded, these bodies collect the fees and distribute them to the rights holders as royalties. Although copyrights may become very valuable over time, creators such as composers, authors etc. will in most cases not be able to receive fair pay-out for their labour as the full copyright revenue of their songs cannot be collected until about 50-100 years after their death, depending on the jurisdiction.

The cash conversion cycle in the music industry is long. It may take years from the day a beat or a rhyme is born, until the finished song brings money to the artist. Today, rights holders must wait several years before getting paid for their work. This often leads to songwriters having to sign unfavorable contracts or being forced to take humdrum jobs.

There is a need for a solution to these problems.

SUMMARY

Attempts have previously been made to valuate intangible assets, for example as shown in the related art document US201303439 A1, which discloses valuation of intangible assets using financial ratios by applying the conventional Net present value (NPV) model. However, conventional financial ratio models, such as the NVP model, are not adapted for estimating the value of an intangible asset. The estimation according to such previous methods will therefore be rough and un-reliable, since its accuracy cannot be confirmed.

The inventors have realized that in order to solve the problem of providing a fair valuation of the intangible asset, a valuation method specifically adapted to the unique properties of different types of intangible assets must be used. Embodiments herein describe such methods that solve or at least ameliorate the problem by providing much more accurate value estimation.

The inventors have further realized that by providing a more reliable and fair valuation of an intangible asset, for example a copyright to a song, setting a fair prize for trading with or investing in an intangible asset is enabled. This further makes it possible to trade and invest in intangible assets, using for instance the primary and secondary market solution presented herein. Thereby, the problem of right holders having to wait a long time, possible years, before getting paid for their work, is solved or at least mitigated.

The inventors have yet further realized that similar problems of obtaining payback often also arise for right holders of other types of intangible assets, such as e.g. a copyright for a music arrangement, an artwork, literature, computer program code or other and may also arise in the case of a patent right; a utility model, a trademark or a design right or design patent. Also for these other types of intangible assets, and other assets that are hard to value using common valuation methods and systems, embodiments presented herein may advantageously be used to obtain a fairer, more objective and transparent valuation.

The core solution of the present disclosure is providing a fairer, more transparent and objective valuation according to embodiments presented herein. This has to the knowledge of the inventors never been attempted before. Instead, it seems to have been agreed by all parties that valuation of intangible assets is hard and should only be attempted by more or less subjective valuation performed by one or more persons who are very familiar with the specific, narrow field to which the intangible asset at hand belongs.

For example, while historically only record labels and specialized finance shops have been able to invest in music rights, embodiments presented herein make these and other intangible assets available to a broader community, allowing anyone to become an investor in e.g. a music artists' craft.

Embodiments presented herein achieve a fairer, more transparent and objective valuation by basing the valuation on data obtained by a combination of: processing a source file representation of an intangible asset to determine characteristics of the intangible asset and obtaining valuation information relating to similar intangible assets based on the characteristics; obtaining data relating to the intangible asset and/or the creator or rights holder from a large number of independent sources, e.g. via social media sources; and using a machine learning model to determine a value based on the obtained valuation information relating to similar intangible assets based on the characteristics and the data relating to the intangible asset and/or the creator or rights holder from the large number of independent sources.

Advantageously, fair valuation leads to fair market pricing when the intangible asset is traded with on a trading platform. This in turn facilitates the accounting for, and communication of musical assets' worth. Thereby, right holders will achieve better credit ratings and consequently thereof better funding terms from banks and other financial institutions.

A further advantage is that creating a platform for investments and/or trading in intangible assets, which is enabled through the improved valuation of intangible assets according to embodiments presented herein, will generate cash flows directly to the creators and rights holders through advance payment, i.e. money when it's needed, shift back power to creators and democratize the investing by redistributing the current power in the value chain as this gives rights holders a new opportunity for receiving pay-off on their laboriously developed intangible assets.

Embodiments presented herein thereby advantageously enable creators of intangible assets to gain control over their financial flows and they further allow for anyone to become an intangible asset investor, implying a democratization of financing of e.g. music, film, literature, game development, technical development (by enabling trading with/financing in patents), trademark development, industrial and other design development, etc.

According to a first aspect, there is provided a system for estimating a current value $V_{CURRENT}$ of an intangible asset, the system comprising a processor; a first interface configured to enable communication between the processor and one or more first data source or one or more second data source; and a memory.

The processor is configured to obtain a source file representing the intangible asset; analyze the source file to identify at least one characteristic of the source file and classify the source file to belong to at least one class C, from a set $SET_C$ of predetermined classes, based on the identified at least one characteristic of the source file. The processor may further be configured to obtain, via the first interface, one or more evaluation parameters $P_{EVAL}$ associated with the creator of the intangible asset from at least one first data source and to check if there exists one or more historical values $V_{HISTORY}$ associated with the intangible asset in a second data source. If there exists one or more historical values $V_{HISTORY}$ associated with the intangible asset in said second data source, the processor may be configured to obtain, via the first interface, at least one of said one or more historical values $V_{HISTORY}$ associated with the intangible asset from said second data source.

Thereafter, the processor may be configured to predict, using a machine learning model, a future value $V_{FUTURE}$ of the intangible asset based on the selected at least one class C; the one or more evaluation parameters $P_{EVAL}$ obtained from the first data source; and the at least one historical value $V_{HISTORY}$, if at least one historical value $V_{HISTORY}$ has been obtained from said second data source. In other words, the processor may be configured to input to a machine learning model: the selected at least one class, the one or more evaluation parameter obtained from the first data source, and the at least one historical value, if at least one historical value has been obtained from said second data source, and the machine learning model may be configured to predict a future value of the intangible asset based on the selected at least one class, the one or more evaluation parameters obtained from the first data source, and the at least one historical value, if at least one historical value has been obtained from said second data source. The processor may further be configured to estimate, by the machine learning model, the current value $V_{CURRENT}$ of the intangible asset based on the predicted future value $V_{FUTURE}$ for a pre-set time period T.

In one or more embodiments, the processor may further be configured to estimate a current value for a defined fraction of the intangible asset, by dividing the estimated current value $V_{CURRENT}$ of the intangible asset by a preset number of fractions.

Each of said at least one first data source may in some embodiments be a social media source.

In one or more embodiments, the processor may further be configured to obtain a pre-set time period T for which a future value $V_{FUTURE}$ of the intangible asset is to be predicted.

The system may further comprise a second interface, and the processor may further be configured to send the estimated current value $V_{CURRENT}$ of the intangible asset, or the estimated current value for a defined fraction of the intangible asset, to one or more user devices via the second interface.

In some embodiments, the processor may further be configured to identify, using the machine learning model, one or more non-linear relationship between one or more evaluation parameter $P_{EVAL}$ and at least one class C to which the source file has been classified to belong, and to base the estimation of the current value $V_{CURRENT}$ of the intangible asset at least partly on the one or more identified non-linear relationship.

In some embodiments, the processor may further be configured to obtain, via the first interface, two or more evaluation parameters $P_{EVAL}$ from at least one first data source, and the processor may further be configured to identify, by the machine learning model, one or more non-linear relationship between two or more of the one or more evaluation parameters $P_{EVAL}$ and to base the estimation of the current value $V_{CURRENT}$ of the intangible asset at least partly on the one or more identified non-linear relationship.

According to another aspect, there is provided a method for estimating a current value $V_{CURRENT}$ of an intangible asset, the method comprising: obtaining, by the processor, a source file representing the intangible asset; analyzing, by the processor, the source file to identify at least one characteristic of the source file; and classifying, by the processor, the source file to belong to at least one class C, from a set $SET_C$ of predetermined classes, based on the identified at least one characteristic of the source file; and obtaining, by the processor, one or more evaluation parameters $P_{EVAL}$ associated with the creator of the intangible asset from at least one first data source, wherein each of said at least one first data source may be a social media source. The method may further comprise checking, by the processor, if there exists one or more historical value $V_{HISTORY}$ associated with the intangible asset in a second data source and, if there exists a historical value $V_{HISTORY}$ associated with the intangible asset in said second data source obtaining, by the processor, at least one of said one or more historical values $V_{HISTORY}$ associated with the intangible asset from said second data source.

The method may further comprise predicting, using the machine learning model 115, the future value $V_{FUTURE}$ of the intangible asset based on the selected at least one class C; the one or more evaluation parameter $P_{EVAL}$ obtained from the first data source; and the at least one historical value $V_{HISTORY}$, if at least one historical value $V_{HISTORY}$ has been obtained from said second data source. The method may thereafter comprise estimating, by the machine learning model, the current value $V_{CURRENT}$ of the intangible asset based on the predicted future value $V_{FUTURE}$ and a pre-set time period T.

In one or more embodiment, the method may further comprise estimating a current value for a defined fraction of the intangible asset, by dividing the estimated current value $V_{CURRENT}$ by a preset number of fractions.

The method may in combination with any of the above embodiments further comprise sending, by the processor, the estimated current value $V_{CURRENT}$ of the intangible asset, or the estimated current value for a defined fraction of the intangible asset, to one or more user device.

In any of the method embodiment presented herein, the at least one identified characteristic of the source file may comprise a data pattern.

In one or more embodiment, the method may further comprise obtaining, by the processor, a pre-set time period T for which a future value $V_{FUTURE}$ of the intangible asset is to be predicted.

According to a further aspect there is provided a computer program loadable into a memory communicatively connected or coupled to at least one data processor, comprising software for executing the method according to any of the embodiments presented herein when the program is run on the at least one data processor.

According to yet another aspect there is provided processor-readable medium, having a program recorded thereon, where the program is to make at least one data processor execute the method according to of any of the embodiments presented herein when the program is loaded into the at least one data processor.

BRIEF DESCRIPTION OF THE DRAWINGS

The invention is now to be explained more closely by means of preferred embodiments, which are disclosed as examples, and with reference to the attached drawings.

DETAILED DESCRIPTION

Introduction

Anyone who wants to trade with intangible assets today must be ready to buy at least an entire intangible asset, often even a portfolio or catalogue of intangible assets. This is of course very expensive, and the trading market is hence available only to large companies, and possibly private investors having access to substantial financial means. As described herein, this leads to financing problems for right holders, as it is hard to obtain fair and/or timely pay-out for a held intangible asset.

The inventors have realized that it is not possible for a private person to invest in or trade with single intangible assets such as a copyright to a song or musical piece or arrangement, a game, a film, computer code, a piece of literature or artwork, or even other types of intangible assets such as a utility model, a patent, a trademark, a design right, a design patent etc., let alone to invest in or trade with fractions of an intangible asset. This problem, or opportunity, has not been previously recognized.

The inventors have further realized that the reason why there exists no solution to how to enable trading with intangible assets without having to sell or acquire one or more entire intangible assets at a time is because there does not exist any method, system or platform for estimating the current value of an intangible asset or a fraction of such an intangible asset in an objective, sufficiently reliable, and/or automated manner. Such current value estimation is essential, since no starting price can be set and hence no trading can be enabled if there is no reliably estimated current, or initial, value to base it on.

The present disclosure describes a system, method and computer program product for estimating a current value of an intangible asset based on a digital representation of the intangible asset.

Figure 3:
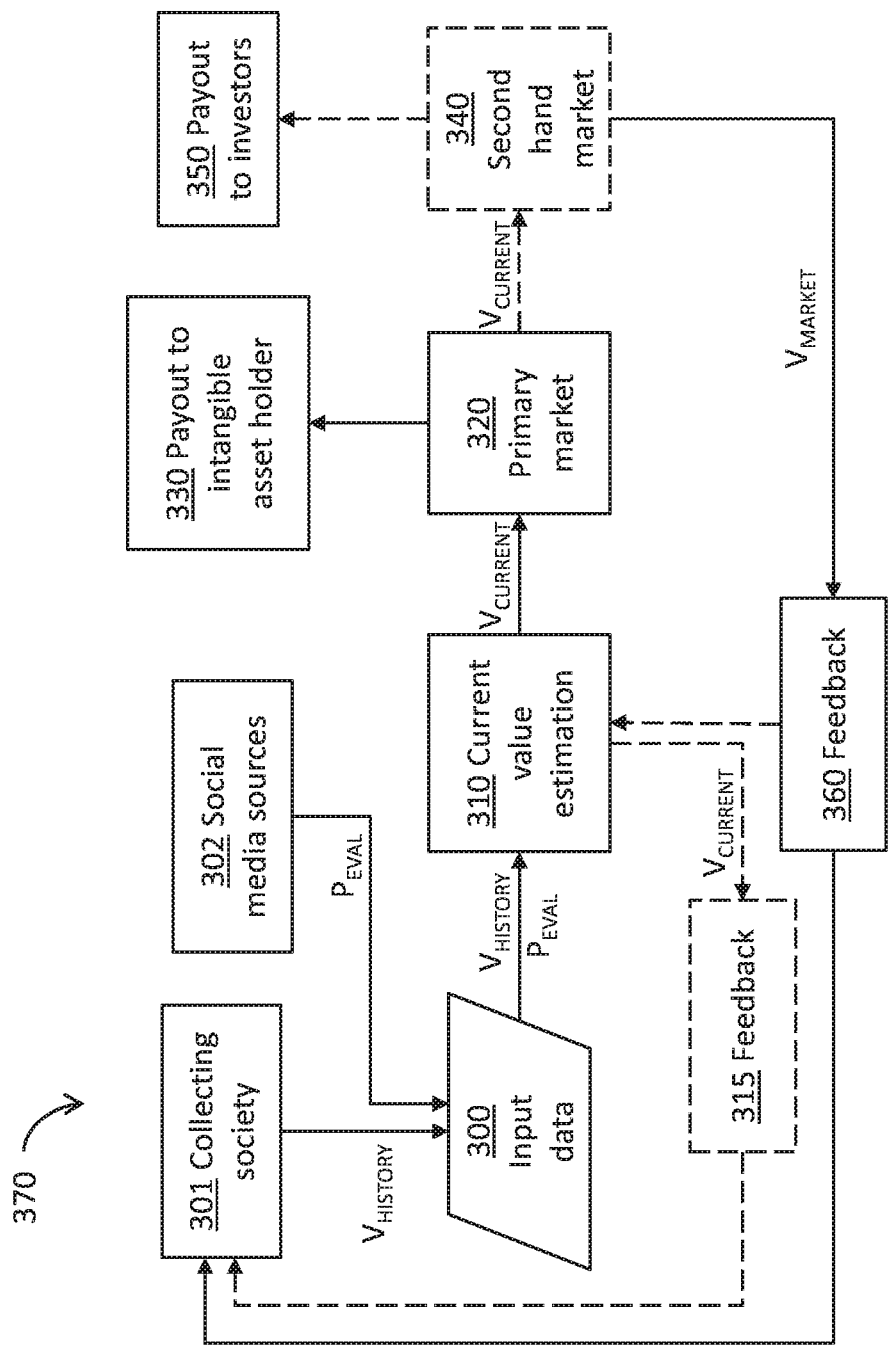
FIG. 3 shows a schematic overview of a trading platform or system enabled by embodiments presented herein.

In other words, estimation of a current value $V_{CURRENT}$ of an intangible asset, according to any of the embodiments herein, enables setting a current, or initial, price for selling or trading with the intangible asset via a trading system or platform. For instance, the current price may in some embodiments be set to the estimated current value $V_{CURRENT}$. In other embodiments the current price may be calculated based on the current value $V_{CURRENT}$ according to any suitable weighting function or other set of logic rules, mathematical functions and/or algorithms. A non-limiting example of a system or platform for enabling trading with intangible assets, including the step of estimating a current value according to any of the embodiments presented herein, is illustrated in FIG. 3.

In previous solutions, estimation of an initial price for an undivided intangible asset, or a portfolio or catalogue of whole intangible assets, is performed at least partially subjectively by a person familiar with the domain of intellectual property rights (IPR) or other relevant area to which the intangible asset(s) up for trading belong.

Embodiments presented herein enable automated estimation of a current value of an intangible asset based on a predicted future value for a pre-set time period by automatically analyzing and processing information obtained from a number of data sources, according to one or more preset rules and conditions. This in itself provides a substantial advantage over the at least partially subjective and less informed estimations of existing solutions.

Embodiments presented herein go even further and enable automated estimation of a current value of, thereby further enabling setting an initial, current, price for, a fraction of an intangible asset, again by automatically analyzing and processing information obtained from a number of data sources, according to one or more preset rules and conditions. This advantageously enables trading with a fraction of an intangible asset.

To provide a fairer, more transparent, more objective and more cost-effective prediction of the future value and estimation of the current value of an intangible asset, the system and method described herein use a machine learning model to perform automated valuations, based on a pre-processed input data. The machine learning model can be trained to give better predictions the more data it is fed. The model will, in short: predict an intangible asset's value for a pre-set time into the future; give the rights holder a fairer and more transparent estimate of the future revenue than previous solutions, based on real data; and support investors etc. in their decisions by providing a more transparent valuation.

As trading with intangible assets is enabled by embodiments presented herein, the holder of a copyright/patent/trademark/design that is traded using the method and system of the present disclosure etc. will receive financial compensation at an early stage, something that is especially important for composers, artist, authors and other actors who often struggle to get their creations into the market and to be compensated to such a level that they will be able to make a living based on their creative work. For patent application or patent holders, for example, the trading possibility may mean that there is an opportunity to receive funding and split the risk for prosecuting, maintaining or enforcing a patent right, since there is a possibility for one or more private or legal persons to buy a defined fraction of the patent right. Through the trading platform that the presently disclosed method and system enable, buyers may in turn get a chance to support their favorite band, composer, artist, brand, or invest in and support an upcoming technology, while at the same time hopefully making a profit.

Since fractions of the intangible assets will be much less expensive than an entire intangible asset, or even a portfolio or catalogue of intangible assets, this advantageously enables a private person and other small actor to invest in or trade with intangible assets, and thereby for example support their favorite artist, composer, author or other, while at the same time hopefully making a profit. The embodiments presented herein hence further enable new markets and new potential buyers to invest, trade, or take part in affecting valuation of intellectual assets.

An intangible asset may in the context of the present disclosure be, but is not limited to, a copyright for a song or musical piece, a music arrangement, an artwork, a piece of literature, computer program code; a patent right; a utility model; a trademark; a design right/design patent right; or the like.

In the present context, a system or system unit obtaining information, data or the like is to be understood as the system or system unit receiving it through a pushing action and/or retrieving it in through a pulling action from another system unit or unit external to the system, but communicably connected to the system or system unit in question.

System Architecture

Below, embodiments of the inventive system are described in more detail, with reference to FIG. 1.

Figure 1:
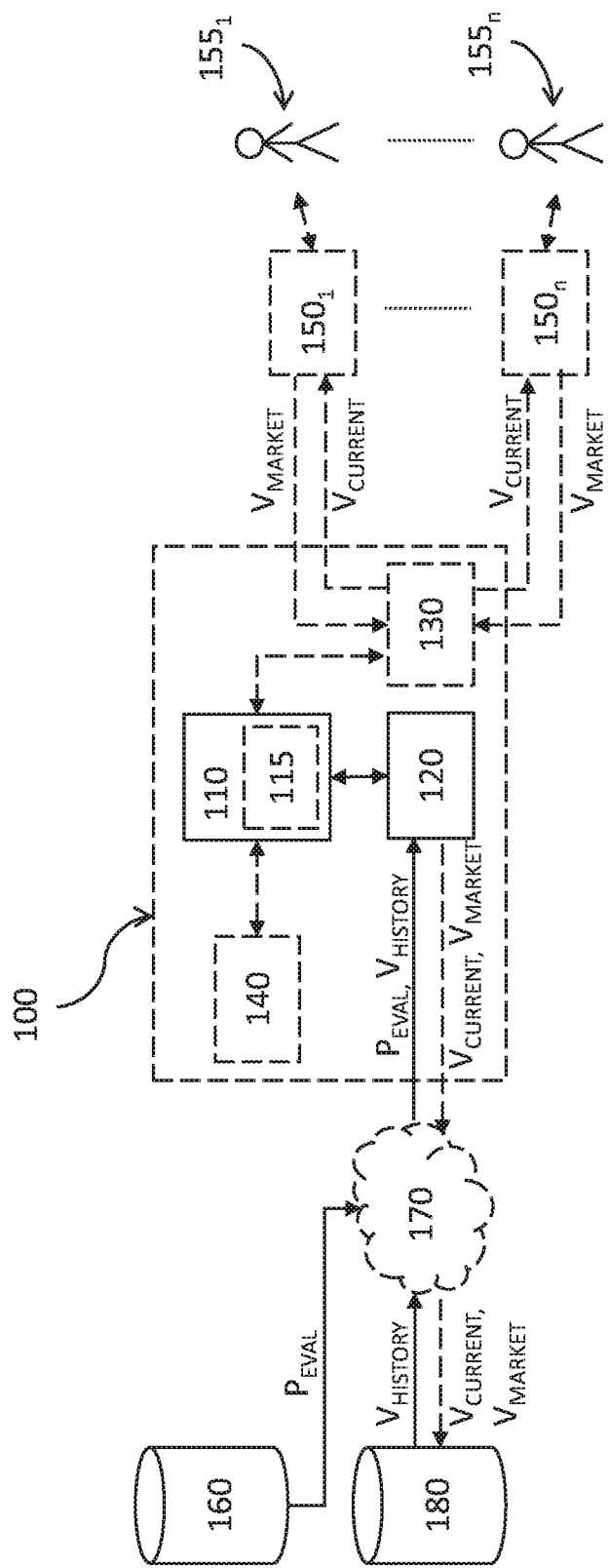
FIG. 1 shows a schematic overview of a system according to one or more embodiments.

FIG. 1 shows a system 100, according to embodiments of the invention, for estimating a current value $V_{CURRENT}$ of an intangible asset, the system 100 comprising a processor 110, a first interface 120 configured to enable communication between the processor 110 and one or more first data source 160 or one or more second data source 180; and a memory 140. Each of the at least one first data source 160 or one or more second data source 180 may be communicably coupled to the processor 110 via a wired or wireless connection in any known manner, for example in the form of a wireless network 170 as illustrated in FIG. 1.

The second interface 130 is configured to enable communication between the processor 110 and an application implemented on one or more user device $150_1 \ldots 150_n$ of corresponding one or more users $155_1 \ldots 155_n$. The one or more user devices $150_1 \ldots 150_n$ may be communicably coupled to the processor 110 via a wired or wireless connection in any known manner. The first and/or the second interface 120, 130, may be configured to enable two-way communication. The first and second interface 120, 130, may be implemented as integrated units, or they may be separate interfaces.

The processor 110 may be configured to obtain a source file representing the intangible asset; analyze the source file to identify at least one characteristic of the source file, such as a data pattern, a content fingerprint, etc., and classify the source file to belong to at least one class C, from a set $SET_C$ of predetermined classes, based on the identified at least one characteristic of the source file. The processor 110 may be configured to obtain, via the first interface 120, one or more evaluation parameters $P_{EVAL}$ associated with the creator of the intangible asset from at least one first data source 160.

In some embodiments, one or more of the at least one first data source 160 is a social media source. In some embodiments, each of the at least one first data source (160) is a social media source.

In the present context, an evaluation parameter is defined as digital data representing information associated with the creator of the intangible asset, which information may be used as a basis for improving estimation of the current value of the intangible asset. Such evaluation parameters may for example relate to the size, composition or other of the creator's network in social media sources, demographics of the creator, demographics of a performer, such as an artist or band if intangible asset is a song or music arrangement, the number of previous "hits", "block busters", "best-sellers" or the like of the creator or performer etc. Possible evaluation parameters be obtained by the processor 110 using an appropriate application programming interface (API) and may include a selection of the following:

Previous airplay on author's songs (includes both traditional and digital media, i.e. Pandora, Apple Music, Spotify, LastFM, etc.)
Current airplay
Previous and current record sales through iTunes and other online music stores
Tour schedule and ticket sale history
Merchandise sales
Active fan bases through social networking sites
Instagram followers
Facebook fan pages
YouTube subscribers
Demographics for the songwriter (data from collective society for instance)
  Gender
  Years of experience
  Number of hits (or the like) created
  Time since latest hit (or the like)
Demographics for the artist (data from Spotify/labels/open API:s etcetera)
  Gender
  Number of followers on Social media
  Country/city
  First release year
  Number of releases (or the like)
  Biggest hit (e.g. number of listens, on how many playlists . . . etc.)
  Reach (for instance how many playlist s/he appears on)
  Diversity (number of genres they are related to)
  Genre (dominant genre, by releases or playlists for instance)
Number of projects (if the same creator is member of many bands or other collaborations or just as individual)

The processor 110 may be configured to check if there exists one or more historical values $V_{HISTORY}$ associated with the intangible asset in a second data source 180 and, if there exists one or more historical values $V_{HISTORY}$ associated with the intangible asset in said second data source 180, obtain, via the first interface 120, at least one of said one or more historical values $V_{HISTORY}$ associated with the intangible asset from said second data source 180.

The processor 110 may further be configured to thereafter predict, using a machine learning model 115, a future value $V_{FUTURE}$ of the intangible asset based at least on the selected at least one class C; the one or more evaluation parameters $P_{EVAL}$ obtained from the first data source; and the at least one historical value $V_{HISTORY}$, if at least one historical value $V_{HISTORY}$ has been obtained from the second data source. In other words, the processor 110 may be configured to input, in the machine learning model 115, the selected at least one class C; the one or more evaluation parameters $P_{EVAL}$ obtained from the first data source; and the at least one historical value $V_{HISTORY}$, if at least one historical value $V_{HISTORY}$ has been obtained from the second data source, wherein the machine learning model (115) is configured to predict a future value ($V_{FUTURE}$) of the intangible asset based on the selected at least one class (C), the one or more evaluation parameters ($P_{EVAL}$) obtained from the first data source, and the at least one historical value ($V_{HISTORY}$), if at least one historical value ($V_{HISTORY}$) has been obtained from said second data source. The future value $V_{FUTURE}$ indicates the value that the intangible asset is estimated to have at a certain time instance in the future, based on the selected at least one class C, the one or more evaluation parameters $P_{EVAL}$ obtained from the first data source, and possibly also the at least one historical value $V_{HISTORY}$ being processed by the logic and rules of the machine learning model 115.

Once the future value $V_{FUTURE}$ has been predicted, the processor 110, or the machine learning model 115, may further be configured to estimate the current value $V_{CURRENT}$ of the intangible asset based on the predicted future value $V_{FUTURE}$ for a pre-set time period T. The processor 110 may in these embodiments further be configured to obtain a pre-set time period T for which a future value $V_{FUTURE}$ of the intangible asset is to be predicted, e.g. by receiving or retrieving the pre-set time period T from an internal memory 140, or from a first data source 160 or a second data source 180 via the first interface 120.

In the present context, the future value $V_{FUTURE}$ indicates the value that the intangible asset is estimated to have at the time instance (present time+T). In the present context, the pre-set time period T may for example be a certain number of days, months or years, or any other suitable time period according to circumstances.

In one or more embodiments, the processor 110 may further be configured to estimate a current value for a defined fraction of the intangible asset, by dividing the estimated current value $V_{CURRENT}$ of the intangible asset by a preset number of fractions. Then umber of fractions may differ between different intangible assets.

The machine learning model may further be configured to apply a weighting to one or more of the selected at least one class C, the one or more evaluation parameters $P_{EVAL}$ obtained from the first data source, and, if applicable, the at least one historical value $V_{HISTORY}$; and, in the case a weight have been applied, predicting the future value $V_{FUTURE}$ of the intangible asset based on the weighted at least one selected class C, the weighted one or more evaluation parameters $P_{EVAL}$ obtained from the first data source, and the weighted at least one historical value $V_{HISTORY}$.

The system 100 may further comprise a second interface 130, and the processor 110 may further be configured to send the estimated current value $V_{CURRENT}$ of the intangible asset, or the estimated current value for a defined fraction of the intangible asset, to one or more user devices $150_1 \ldots _n$ via the second interface 130.

The obtained data on which the current value estimation is based may further be used for continuous or future improvement and development of the system and the current value prediction. Machine learning, AI or other analytics may for example be used to detect non-linear and/or complex patterns that are significant for the determination of the current value estimation and that can then be included in the estimation model to improve the current value estimation. For instance, the processor 110 may further be configured to identify, using the machine learning model 115, one or more non-linear relationship between one or more evaluation parameters $P_{EVAL}$ and at least one class C to which the source file has been classified to belong, and to base the estimation of the current value $V_{CURRENT}$ of the intangible asset at least partly on the one or more identified non-linear relationship. Alternatively, or in combination, the processor 110 may be configured to obtain, via the first interface 120, two or more evaluation parameters $P_{EVAL}$ from at least one first data source 160, and wherein the processor 110 is further configured to identify, by the machine learning model 115, one or more non-linear relationship between two or more of the one or more evaluation parameters $P_{EVAL}$ and to base the estimation of the current value $V_{CURRENT}$ of the intangible asset at least partly on the one or more identified non-linear relationship.

The one or more user devices $150_1 \ldots _n$ may in turn comprise input functionality and a graphical user interface (GUI) configured to display a graphical representation of an interactive trading application utilizing the estimated current value according to any of the embodiments presented herein as the bases for valuation of intangible assets up for trade.

The units of the system 100 may be configured to use any suitable wired and/or wireless communication technologies known in the art for communicating with each other.

Figure 5:
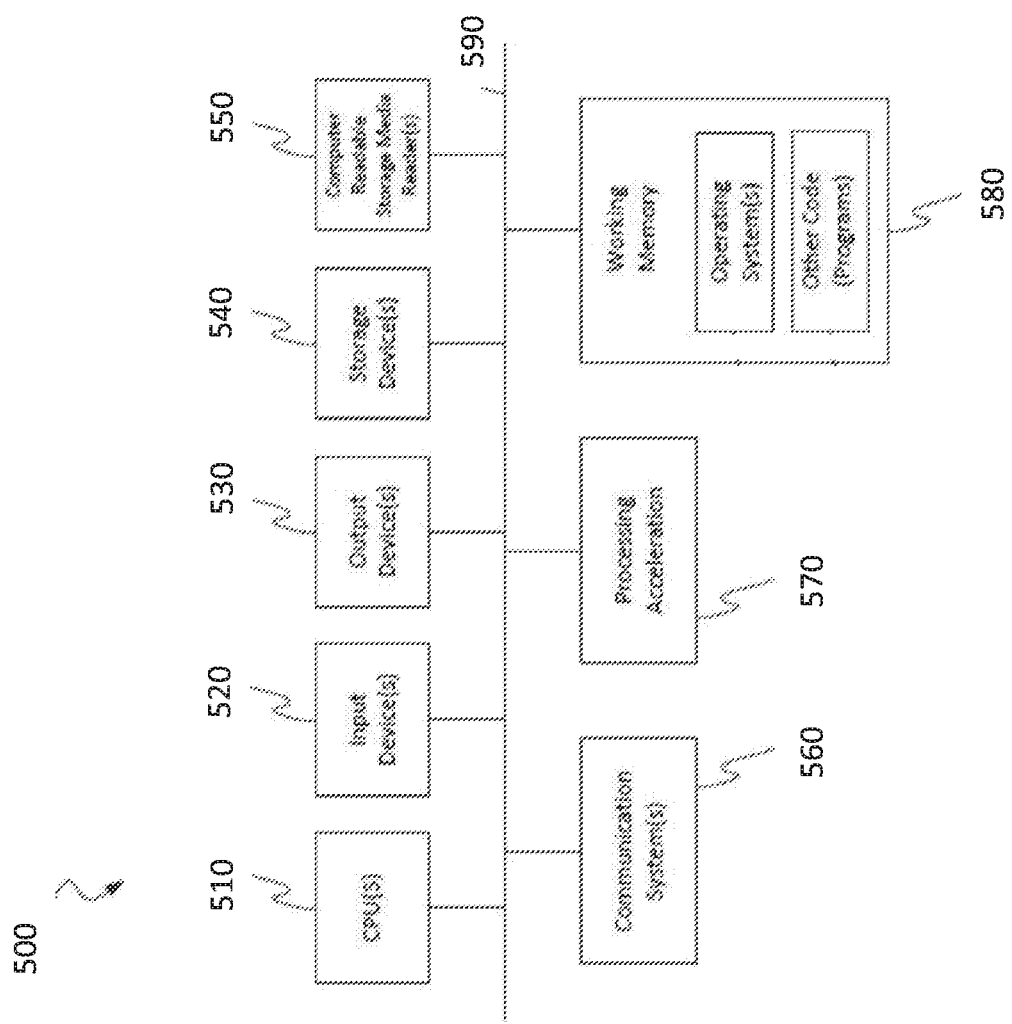
FIG. 5 shows is a block diagram illustrating a specialized computer system in which embodiments of the present disclosure may be implemented.

FIG. 5 is a block diagram illustrating a specialized computer system 500 in which embodiments of the present disclosure may be implemented. This example illustrates a specialized computer system 500 such as may be used, in whole, in part, or with various modifications, to provide the functions of components described herein.

Specialized computer system 500 is shown comprising hardware elements that may be electrically coupled via a bus 590. The hardware elements may include one or more central processing units, or processors, 510, one or more input devices 520 (e.g., a mouse, a keyboard, eye tracking device, etc.), and one or more output devices 530 (e.g., a display device, a printer, etc.). Specialized computer system 500 may also include one or more storage devices 540. By way of example, storage device(s) 540 may be disk drives, optical storage devices, solid-state storage devices such as a random access memory ("RAM") and/or a read-only memory ("ROM"), which can be programmable, flash-updateable and/or the like.

Specialized computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, specialized computer system 500 may also include a processing acceleration unit 570, which can include a digital signal processor, a special-purpose processor and/or the like.

Figure 6:
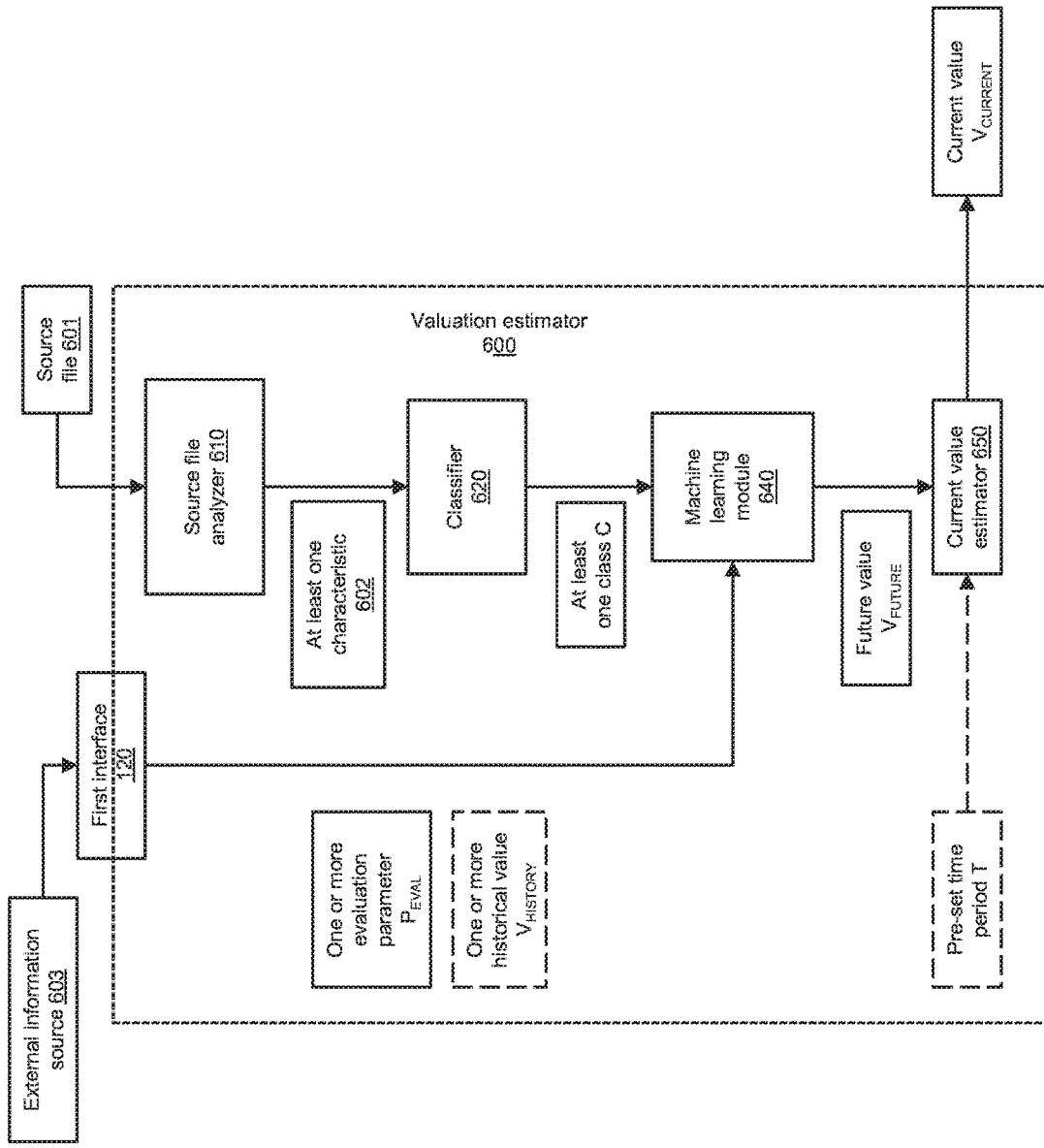
FIG. 6 illustrates example components of a valuation estimator for estimating a current value of an intangible asset, according to an embodiment.

FIG. 6 illustrates example components of a valuation estimator 600 for estimating a current value $V_{CURRENT}$ of an intangible asset, according to an embodiment. As illustrated, the valuation estimator 600 includes a source file analyzer 610, a classifier 630, a machine learning module 640, a first interface 120 and a current value estimator 650. Some or all these components can be implemented as specialized hardware and/or as software modules (e.g., specific computer-readable instructions) hosted on specialized or general processing hardware.

As illustrated, a source file 601 is input to the source file analyzer 610. The source file 601 may be a source file according to any embodiment described herein. In response, the source file analyzer 610 analyzes the source file 601 to identify at least one characteristic 602 of the source file 601. Each of the at least one characteristic 602 of the source file 601 may be a characteristic according to any embodiment described herein.

The classifier 620 receives the at least one characteristic 602 of the source file 601 and, in response, is configured to classify the source file 601 to belong to at least one class C, from a set $SET_C$ of predetermined classes. The classifier 620 may be configured to perform the classification according to any embodiment described herein. The classifier 620 is further configured to input the at least one class C into the machine learning module 640 for processing according to any of the embodiments presented herein.

One or more evaluation parameter $P_{EVAL}$ and, optionally, one or more historical value $V_{HISTORY}$ are obtained via the first interface 120, from one or more external information source 603, and input into the machine learning module 640. The one or more external information source 603 may include the collecting society 301 and/or social media sources, as described herein.

The machine learning module 640 comprises a machine learning model 115 and is configured to predict a future value $V_{FUTURE}$ of the intangible asset based on the selected at least one class C, the one or more evaluation parameters ($P_{EVAL}$) obtained from the first data source, and the at least one historical value $V_{HISTORY}$, if at least one historical value $V_{HISTORY}$ has been obtained. The machine learning module 640 is further configured to input the future value $V_{FUTURE}$ into the current value estimator 650.

The current value estimator 650 receives the future value $V_{FUTURE}$ and, in response, is configured to estimate a current value $V_{CURRENT}$ of the intangible asset based on the predicted future value $V_{FUTURE}$ for a pre-set time period T.

Method Embodiments

Turning to FIG. 3, a flowchart process is shown illustrating a trading platform 370 enabled by embodiments presented herein and the impact it has on the users interacting with it. Input data 300 is received in or provided to the platform, for example in the system 100 as further described herein. The input data 300 shown in the example of FIG. 3 comprises one or more historical values $V_{HISTORY}$ associated with an intangible asset, if such exist in a second data source 180. In FIG. 3, the first data source is illustrated as the collecting society 301. The input data 300 shown in the example of FIG. 3 further comprises one or more evaluation parameters $P_{EVAL}$ obtained (received or retrieved) from one or more first data source 160 in the form of one or more social media source 302.

In the process step 310, the current value for an intangible asset is estimated based on the input data, according to any of the embodiments presented herein. The estimated current value is then communicated to the primary market 320, whereby trading is enabled.

The estimated current value $V_{CURRENT}$ may in the optional process step 315 be fed back to the collecting society 301, thereby becomes part of, or being used for determining, the input data 300 in the next iteration of the process, so that the machine learning model may be further trained and the current value estimation of the same or a similar/associated intangible asset may hence be further improved every time the trading platform is used.

In some embodiments, the primary market 320 is intended for enabling investors to buy entire, or fractions of, intangible assets according to an estimated current, or initial, price for selling or trading with the intangible asset or fraction of the asset via a trading system or platform, wherein the current, or initial, price is set based on the estimated current value $V_{CURRENT}$. This is discussed further in connection with FIG. 2.

The intangible asset holder/owner receives payout 330 when at least a fraction of the intangible asset is sold. Thereby, the intangible asset holder/owner receives payout for the intangible asset at an earlier stage than would be the case with traditional intangible asset selling, and possibly gradually if intangible asset is sold one or more fractions at a time. As a fraction of an intangible asset is much less expensive than the entire intangible asset, which may be valued to a high price, small actors such as private investors may buy into the intangible asset already at the primary market 320, so the primary market is opened up to a much bigger market than what is involved in buying and selling of intangible assets in the traditional manner.

In the context of the present disclosure, trading with an intangible asset or fraction of the intangible asset does not imply sharing of royalty ownership, but rather represents a share of future intangible asset revenues.

In embodiments wherein the primary market 320 is intended for enabling investors to buy entire, or fractions of, intangible assets according to an estimated current, or initial, price, and once all fractions of the intangible asset that the intangible rights holder has made available for sale have been bought, the intangible asset may be made available to a second hand market 340. On the second hand market 340, trading at market prices commences and the investors receive return payout 350 for their investments.

In alternative embodiments, the primary market 320 is intended for enabling trading at market prices directly, based on the estimated current, or initial, value. According to these embodiments there is hence no need for the additional step of first selling entire, or fractions of, intangible assets according to an estimated current, or initial, price on a separate market.

The market price obtained for an intangible asset or a fraction of the same, also referred to as market value $V_{MARKET}$ for the intangible asset, is preferably in process step 360 fed back to the system/platform and becomes part of, or is used for determining, the input data 300 in the next iteration of the process, so that the machine learning model may be further trained and the current value estimation of the same or a similar/associated intangible asset may hence be further improved every time the trading platform is used.

In some embodiments, the market value $V_{MARKET}$ for the intangible asset is in process step 360 also, or alternatively, fed back to the current value estimation step 310, so that the machine learning model may be further trained and the current value estimation of the same or a similar/associated intangible asset may hence be further improved every time the trading platform is used.

The flow of FIG. 3 may be described as a method for enabling trading of intangible assets on a trading platform 370, the method comprising: estimating, by a valuation estimator 600 or a processor 110, a current value $V_{CURRENT}$ of an intangible asset, according to the method of any of the claims 9 to 14; making the intangible asset available to a first hand, or primary, market 320 at the estimated current value $V_{CURRENT}$, via the trading platform 370; if at least a fraction of the intangible asset is sold to one or more investor on the primary market 320, provide, via the trading platform 370, payout to the intangible asset holder; making the intangible asset available to a second hand market 340 at the estimated current value $V_{CURRENT}$, via the trading platform 370. If at least a fraction of the intangible asset is sold on the second hand market 340, the method further comprises updating the value of the intangible asset to a market value $V_{MARKET}$ based on the price at which it was sold; and providing, via the trading platform 370, payout to the investors.

The method may further comprise feeding back the current value $V_{CURRENT}$ of the intangible asset from the valuation estimator 600 or the processor 110 to the collecting society 301, via the trading platform 370.

The method may further comprise feeding back the market value $V_{MARKET}$ from the second market 340 to the collecting society 301, via the trading platform 370. Alternatively, or in combination, the method may further comprise feeding back the market value $V_{MARKET}$ from the second market 340 to the valuation estimator 600, via the trading platform 370.

In one or more embodiments, the method is performed repeatedly. Thereby, the machine learning model 115 continuously receives and is trained using new, relevant information, whereby the performance of the machine learning model 115 with regard to future value estimation is continuously improved.

A core value of the valuation according to embodiments herein is the agnostic relation to the characteristics, and how they may optionally be weighted. It should be kept in mind that it is hard, if not impossible, for the human mind to assess what factors will lead to a successful revenue stream in the world of intangible assets. Embodiments herein solve the problem of automatically tuning the valuation model beyond the humanly perceived factors, and this is a key factor in creating a reliable and trustworthy valuation of intangible assets, i.e. a valuation that with high confidence comes close to the actual revenue worth. Factors and conclusions and weighting etc. extracted according to any embodiment described herein may be fed to the iterative, machine learning based valuation model, thereby enabling results beyond what is humanly derivable and imaginable and continuously improving the valuation by adapting it more and more to the specific properties of the intangible assets to be evaluated.

In the creation of a Primary market it is of great importance, for long term credibility of the markets created, that the valuation of the assets to be put on the market are close to the actual revenue, i.e. that the estimation of future and current value is highly accurate.

Estimation of the value of an intangible asset in, and possibly of a fraction of the intangible asset, according to embodiments herein may of course be used for other purposes than for direct trading via a trading system or platform. For example, tools and services based on one or more of the fairer, more transparent and more objective value estimation embodiments presented herein may be provided in order to valuate fractions of or an entire intangible asset, or a catalogue of intangible assets, for a due diligence, business intelligence purposes, etc.

The system 100 may be configured to perform the method according to any of the embodiments herein repeatedly.

Figure 2:
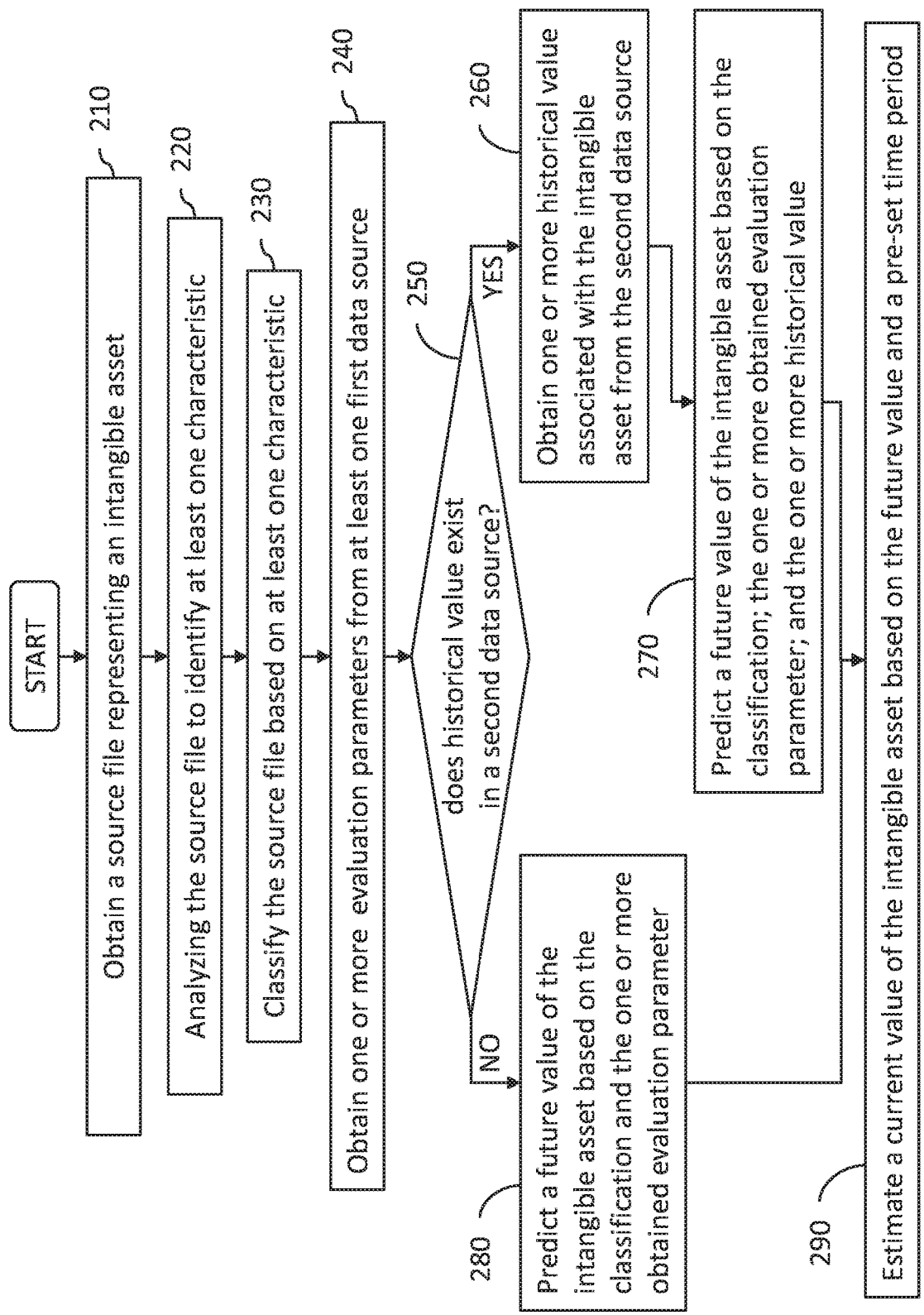
FIG. 2 is a flow chart of a method according to one or more embodiments.

FIG. 2 shows a method according to one or more embodiments for estimating a current value $V_{CURRENT}$ of an intangible asset, the method comprising:

In step 210: obtaining, by the processor 110, a source file representing an intangible asset.

As non-limiting examples, the intangible asset represented by the source file may be a copyright to a song, game, film, piece of literature or artwork, or any other type of intangible assets such as a patent, a trademark, a design right etc.

In step 220: analyzing, by the processor 110, the source file to identify at least one characteristic of the source file.

In one or more embodiments, the at least one identified characteristic of the source file may comprise a data pattern.

The characteristics may be of many different kinds, depending on the type of intangible asset etc., but they are all selected because they are believed to have an effect on the value development of the intangible asset over time. This assumption may be experience based, from knowledge that the value development over time is expected to follow the pattern of other, similar or otherwise related, songs/patents/trademarks etc.

In step 230: classifying, by the processor 110, the source file to belong to at least one class C, from a set $SET_C$ of predetermined classes, based on the identified at least one characteristic of the source file.

In embodiments wherein the at least one identified characteristic of the source file comprises a data pattern, the classification of the source file may be based on the identified data pattern.

The classification may be done by comparing the identified at least one identified characteristic of the source file, such as an identified data pattern if such a pattern has been identified, to one or more stored source file characteristics associated with one or more of the classes of the set $SET_C$.

In some embodiments, comparison and classification may comprise determining how the source file content or characteristics is similar or differs from that of other source files representing intangible assets created by the same creators or other creators—by any property/characteristic or combination of properties/characteristics.

In some embodiments, classification may be done by comparing the identified at least one characteristic of the source file, such as an identified data pattern if such a pattern has been identified, to one or more stored characteristics. The source file may in these embodiments be determined to belong to a class C of the set $SET_C$ if the difference between the identified at least one characteristic of the source file and a stored characteristic associated with a class C of the set $SET_C$ is small enough. For instance, the source file may be determined to belong to the class C of the set $SET_C$ if the difference is less than a preset threshold. Alternatively, the source file may be determined to belong to a class C e.g. if the difference between the identified at least one characteristic of the source file and a stored characteristic associated with a class C of the set $SET_C$ is smaller than the difference compared to any of the remaining stored characteristics.

In order for the valuation to perform well and produce reliable and sufficiently accurate valuation of intangible assets, the machine learning model must be fed with data that is probable to be relevant to the asset that is valuated. This is one of the things that make previously known valuation solutions unsuitable to assess the value of intangible assets, because the input on which the valuation is performed is not specifically adapted to the properties of the intangible assets. Another reason that the embodiments presented herein provide a much more reliable valuation of intangible assets than previously known attempt is that there is provided a method to analyze the data characteristics of a source file representation of an intangible asset and to draw conclusions based on these data characteristics.

For example, if the intangible asset is a music copy right, the source file representation is a music file that processor or machine learning model may be configured to analyze by means of signal processing of the sound wave or frequency data. Characteristics of the source file may for example comprise data deriving from the concept of tonality, including pitches, chords, velocity, in a hierarchy of perceived relations, relations, stabilities, attractions and directionality, but also properties such as lyrics, vocal properties, perception of harmony, dissonance, timbre and psychoacoustics, etc. Such data may include, but is not limited to, velocity data, velocity patterns, frequency patterns, frequency dependent variations and/or other data on a format able for a computer to analyze.

In another example, the intangible asset may be a piece of visual art, wherein the source file is an image file that the processor or machine learning model may be configured to analyze by means of image processing, or by analysis of a multi-dimensional rendering of the piece of visual art for example in the form of color-material-position analysis, depending on which type of image data is comprised in the source file representation. Characteristics of the source file may for example comprise vector-based shape or pattern recognition, color information, material information, factors derived from perception simulation etc.

For any of the above examples, or other intangible assets for which defining and comparable characteristics may be derived from a digital source file representation of the same, all of the exemplified characteristics are retrievable by computer processing of the digital source file. The characteristics can further be objectively compared to other stored source file characteristics obtained through similar analysis of source files representing other comparable intangible assets (in this case other music files). Based on the characteristics obtained from the source file analysis, the source files can be objectively classified and determined to belong to a class C of the set $SET_C$. The classes C of the set $SET_C$ are suitably selected such that the classification into a certain class is with high probability related to the expected future value of the intellectual asset. By making the analysis step objective and automated, and based on data relevant to the future revenue connected to the specific type of intellectual asset to be valuated, the valuation becomes much more reliable than what is achieved by subjective manual valuation (a person making a more or less qualified guess, very uncertain), or automatic valuation based on a standard valuation model that has not been adapted to the properties of an intellectual asset.

Embodiments presented herein further provide tuning of the machine learning model based on feedback from the primary market 320 and/or the second hand market 340. Feedback embodiments are described more in connection with FIG. 3.

In a non-limiting example the at least one characteristic of the source file may comprise at least one frequency data pattern, whereby analyzing the source file to identify at least one characteristic of the source file may comprise analyzing frequency data of the source file to identify the at least one frequency data pattern. In a further non-limiting example the intangible asset represented by the source file may be a music piece, whereby the digital representation of the music piece may comprise characteristics in the form of one or more specific frequency pattern depending on the music genre or genres that the music piece belongs to. In these examples, one or more genres may be identified in step 220, and used for classification of the source file in step 230. In other words, in some embodiments each of the classes in the set $SET_C$ of predetermined classes may represent a musical genre, wherein an intangible asset in the form of a music piece may be classified to belong to one or more of said musical genres according to any of the classification embodiments presented herein.

Figure 4:
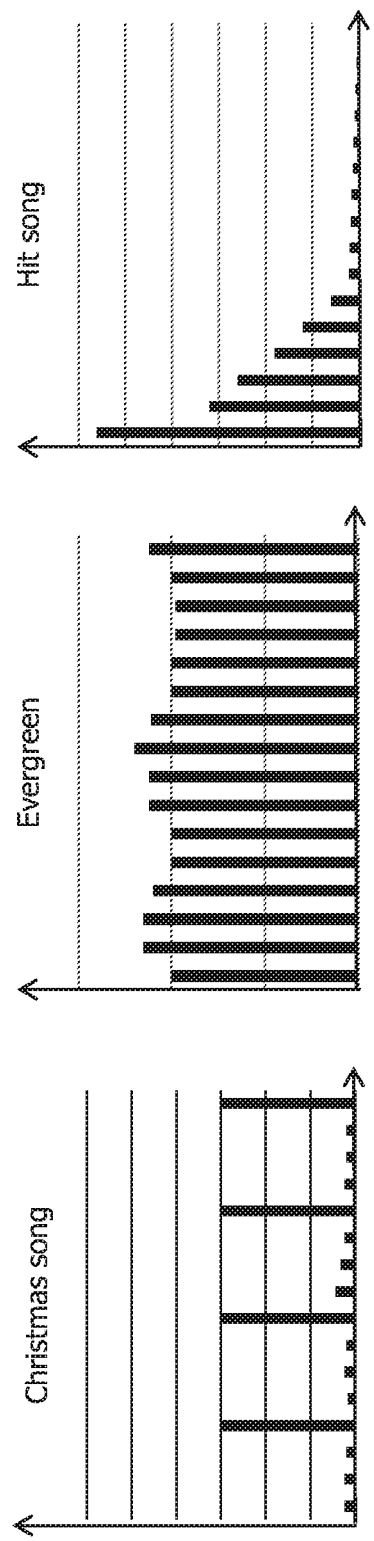
FIG. 4 illustrates examples of patterns of value variation for an intangible asset.

In a non-limiting example, wherein the source file comprises historical value information associated with the intangible asset, analyzing the source file to identify at least one characteristic of the source file may comprise analyzing the historical value information to identify a pattern. Such a pattern may be compared to predetermined patterns relating to intangible assets known to vary in value in known manners. This may be exemplified, for understanding purposes only, by songs from different musical genres or types that have different revenue patterns over time. Some non-limiting examples of patterns of value variation for an intangible asset, in this case copyrights for songs, is illustrated by the plotted graphs of FIG. 4, wherein "Christmas song" represents a seasonal hit that obtains an increase in value or revenues every year around Christmas, "Evergreen" represents an evergreen song showing small variations in value or revenue over time, and "Hit song" represents a popular hit song that initially has a high value or revenue and where the value or revenue then gradually decreases. In FIG. 4, the x axis shows time and the y axis shows value or revenue.

In yet other non-limiting examples, analyzing the source file to identify at least one characteristic of the source file may comprise identifying a selection of the following characteristics: genre (if applicable), gender of the rights holder, distributor, marketing characteristics, country/market, language (if applicable) etc. Any suitable combination of characteristics is plausible.

Still other non-limiting examples of analyzing the source file to identify at least one characteristic of the source file may comprise analyzing time series and/or dependencies of different kinds.

A combination of any or all of the above non-limiting examples of analyzing the source file to identify at least one characteristic of the source file, along with any other suitable source file data analysis, is also feasible within the scope of the present disclosure.

The processor 110 may correspondingly be configured to analyze the source file to identify at least one characteristic of the source file according to any of the embodiments presented herein. The set $SET_C$ of predetermined classes and any source file characteristic associated with one or more of the classes of the set $SET_C$ may be stored in and retrieved or received in the processor from an internal memory 140 or be accessible by the processor from a memory external to the system.

In step 240: obtaining, by the processor 110, one or more evaluation parameters $P_{EVAL}$ associated with the creator of the intangible asset from at least one first data source 160. The at least one first data source 160 may be at least one social media source.

In step 250: checking, by the processor 110, if there exists one or more historical value $V_{HISTORY}$ associated with the intangible asset in a second data source 180.

If there exists one or more historical value $V_{HISTORY}$ associated with the intangible asset in said second data source 180, the method continues with step 260.

In step 260: obtaining, by the processor 110, at least one of said one or more historical values $V_{HISTORY}$ associated with the intangible asset from said second data source 180.

In the present context a historical value $V_{HISTORY}$ associated with the intangible asset may be a historical payout or revenue for the intangible asset, or a historical payout or revenue for another other intangible asset e.g. having the same creator, and/or being classified to belong to at least one class to which the intangible asset is also classified, and/or in another way being comparable in value to the intangible asset that is currently being processed according to any suitable rule.

The at least one historical value associated with each of the one or more other source files may be stored in and retrieved by the processor from an internal memory 140, or from an external memory, which may be one of the first or second data storages.

In step 270: predicting, using a machine learning model 115, a future value $V_{FUTURE}$ of the intangible asset based on the selected at least one class C; the one or more evaluation parameters $P_{EVAL}$ obtained from the first data source; and the at least one historical value $V_{HISTORY}$ associated with the intangible asset.

In other words, the processor 110 may be configured to inputting, to a machine learning model: the selected at least one class C, the one or more evaluation parameter $P_{EVAL}$ obtained from the first data source, and the at least one historical value $V_{HISTORY}$, if at least one historical value $V_{HISTORY}$ has been obtained from said second data source, wherein the machine learning model is configured to predict a future value $V_{FUTURE}$ of the intangible asset based on the selected at least one class C, the one or more evaluation parameters $P_{EVAL}$ obtained from the first data source, and the at least one historical value $V_{HISTORY}$, if at least one historical value $V_{HISTORY}$ has been obtained from said second data source.

If the check in step 250 shows that no historical value $V_{HISTORY}$ associated with the intangible asset exists in the second data source 180, the method instead continues with step 280.

In step 280: predicting, using a machine learning model 115, a future value $V_{FUTURE}$ of the intangible asset based on the selected at least one class C and the one or more evaluation parameters $P_{EVAL}$ obtained from the first data source 160.

The prediction of the current value $V_{CURRENT}$ of the intangible asset in either step 270 or 280 is based on amongst others the selected at least one class C may comprise retrieving, for each of the at least one class C, at least one historical value associated with each of one or more other source files representing a respective one or more other intangible asset that have been previously classified to belong to the same class.

The method may further comprise identifying by the machine learning model 115 one or more non-linear relationship between one or more evaluation parameters $P_{EVAL}$ and at least one class C to which the source file has been classified to belong. Alternatively, or in combination, in embodiments wherein at least two evaluation parameters $P_{EVAL}$ have been obtained, the method may further comprise identifying, by the machine learning model 115, one or more non-linear relationship between two or more of the one or more evaluation parameters $P_{EVAL}$. These optional embodiments advantageously provide improved value prediction, as hidden relationships not identifiable by a human are found based on the input data. The method may therefore advantageously comprise, in the prediction step of 270 or 280, basing the estimation of the current value ($V_{CURRENT}$) of the intangible asset also on one or more identified non-linear relationship.

As some non-limiting examples, the machine learning model 115 may be based at least in part on one or more time series and/or regression algorithms and/or one or more neural network.

In some embodiments, the method step 270 or 280 of predicting the future value $V_{FUTURE}$ of the intangible asset may further be based on, or the processor may further be configured to base the future value $V_{FUTURE}$ of the intangible asset on, one or more human perception parameter, in the form of any electronically measurable indication that a listener/viewer/reader etc. knowingly or indivertibly gives in response to the intangible asset, for example including but not limited to making sounds, eye movements, a rise or fall in temperature or heartbeat frequency, etc. In these embodiments, the system 100 may comprise one or more sensor configured to measure such indications and to send the measurement to the processor. Of course, the one or more human perception parameter may also be fed back in the system, to further improve the machine learning model performance.

After the prediction of step 270 or 280, the method further comprises:

In step 290: estimating the current value $V_{CURRENT}$ of the intangible asset based on the predicted future value $V_{FUTURE}$ and a pre-set time period T.

The estimation in step 290 may be performed by the machine learning model 115, subsequent to the prediction of step 270 or 280. Alternatively, the estimation in step 290 may be performed by the processor 110, based on the output prediction result from the machine learning model performing the prediction of step 270 or 280.

The order of steps 210 to 260 of FIG. 2 may be altered in any suitable manner, and/or two or more of them may be performed in parallel if this is preferable, as this will not affect the end result of the prediction and estimation of steps 270, 280, and 290. The only limitations are that step 220 of analyzing the source file cannot be performed before obtaining the source file in step 210, and that obtaining one or more historical value in step 260 is not performed before checking if such a value or values exist in step 250.

The method may further comprise to applying a weighting to one or more of the selected at least one class C, the one or more evaluation parameters $P_{EVAL}$ obtained from the first data source, and, if applicable, the at least one historical value $V_{HISTORY}$; and, in the case a weight have been applied, predicting the future value $V_{FUTURE}$ of the intangible asset based on the weighted at least one selected class C, the weighted one or more evaluation parameters $P_{EVAL}$ obtained from the first data source, and the weighted at least one historical value $V_{HISTORY}$.

Optionally, the method further comprises the step of obtaining, by the processor 110, a pre-set time period T for which a future value $V_{FUTURE}$ of the intangible asset is to be predicted. The step of obtaining the pre-set time period T may be performed before, between or in parallel with any of the method steps 210 to 260. The pre-set time period T may e.g. be received or retrieved from a memory, such as the memory 140, from a first or second data source 160, 180, or from a user device 150, a central server or an external memory communicably connected to the processor 110, e.g. via the second interface 130.

The method may in some embodiments comprise estimating, by the processor 110, a current value for a defined fraction of the intangible asset, based on the estimated current value $V_{CURRENT}$ of the intangible asset. This may be achieved by dividing the estimated current value $V_{CURRENT}$ by a preset number of fractions. The number of fractions may differ from one intangible asset to another.

In one or more embodiment, the method may further comprise sending, by the processor, the estimated current value $V_{CURRENT}$ of the intangible asset, or the estimated current value for a defined fraction of the intangible asset, to one or more user device $150_{1...n}$.

According to one or more embodiment, the method of FIG. 2 may further comprise setting an initial price for the intangible asset based on the estimated current value $V_{CURRENT}$. In some embodiments, the method comprises setting the current price to the estimated current value $V_{CURRENT}$. In other embodiments, the method may comprise setting an initial price for the intangible asset based on the estimated current value $V_{CURRENT}$ by calculating a current price based on the current value $V_{CURRENT}$ according to any suitable weighting function or other set of logic rules, mathematical functions and/or algorithms. Correspondingly, according to one or more embodiment, the processor 110 may be configured to set an initial price for the intangible asset based on the estimated current value $V_{CURRENT}$. In some embodiments, the processor 110 may be configured to set the current price to the estimated current value $V_{CURRENT}$. In other embodiments, the processor 110 may be configured to set an initial price for the intangible asset based on the estimated current value $V_{CURRENT}$ by calculating a current price based on the estimated current value $V_{CURRENT}$ according to any suitable weighting function or other set of logic rules, mathematical functions and/or algorithms.

All of the process steps, as well as any sub-sequence of steps, described with reference to FIG. 2 above may be controlled by means of a programmed data processor. Moreover, although the embodiments of the invention described above with reference to the drawings comprise a data processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), an EPROM (Erasable Programmable Read-Only Memory), an EEPROM (Electrically Erasable Programmable Read-only Memory), or a magnetic recording medium, for example a hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Program code, which, when run in the processor 110, causes the system 100 to perform the method according to any of the method embodiments herein may already be pre-stored in an internal memory 120 of the system 100. The processor 110 is in such embodiments communicably connected to the internal memory 120.

In one or more embodiments, there may be provided a computer program loadable into a memory communicatively connected or coupled to at least one data processor, e.g. the processor 110, comprising software for executing the method according any of the embodiments herein when the program is run on the at least one processor 110.

In one or more further embodiment, there may be provided a processor-readable medium, having a program recorded thereon, where the program is to make at least one data processor, e.g. the processor 110, execute the method according to of any of the embodiments herein when the program is loaded into the at least one data processor.

Further Advantages

As explained herein, the problem of providing a fairer, more objective and/or transparent valuation of intangible assets has not previously been realized, and solutions have therefore not existed. Now that a solution is provided, this may affects rights holders, creators and possible investors in many advantageous ways, as presented herein. Below are listed a number of non-limiting examples of such advantageous enabled by embodiments of the present disclosure.

By embodiments presented herein, not only will fans be able to connect with their favorite artists, but anyone—from music lover to institutional investor—will be able to invest in an asset class whose risks do not correlate with systematic risks in other markets. Also, there is enabled a safe and secure platform for e.g. singer/songwriters, authors etc. to raise capital for their next album, book, tour and the like.

Music/art/literature etc. copyright holders, or other intangible asset holders, will find a financing opportunity through transparent market pricing of their asset or catalogue. As a further result, music/book publishers and others may obtain better credit ratings and lower interest costs.

There may be provided a safe and secure first/primary and possibly also secondary market for investors/fans etc. to receive a financial return on their investments, opposed to experiential returns being the only previous option.

As a bonus, singers, songwriters, writers, artists, publishers etc. may obtain a platform based on which they can re-educate the younger generation on the value of music, art and literature.

The invention is not restricted to the described embodiments in the figures, but may be varied freely within the scope of the claims.

The invention claimed is:

1. A system (100) for estimating a current value (VCURRENT) using a digital representation of an intangible asset, the intangible asset being a piece of music, a game, a film, a piece of computer code or a piece of visual art, the system (100) comprising:
   a processor (110); a first interface (120) configured to enable communication between the processor (110) and one or more first data source (160) or one or more second data source (180); and a memory (140), wherein the processor (110) is configured to:
   obtain a source file with the digital representation of the intangible asset;
   analyze the digital representation to identify at least one characteristic of the digital representation, wherein the at least one characteristic comprises a data pattern;
   classify the digital representation to belong to at least one class (C), from a set (SETc) of predetermined classes, based on the identified at least one characteristic of the digital representation;
   obtain, via the first interface (120), one or more evaluation parameters (PEVAL) associated with a creator of the intangible asset from at least one first data source (160);
   check if there exists one or more historical values (VHISTORY), wherein the one or more historical values (VHISTORY) comprise one or more previously estimated current values (VCURRENT) or one or more previously estimated market values (VMARKET) associated with the intangible asset in a second data source (180); and, thereafter, obtain, via the first interface (120), at least one of said one or more historical values (VHISTORY) associated with the intangible asset from said second data source (180);

iteratively train a neural network machine learning model based on the one or more historical values (VHISTORY);

apply the neural network machine learning model (115) to identify a future value (VFUTURE) of the intangible asset based on at least: the selected at least one class (C); the one or more evaluation parameters (PEVAL) obtained from the first data source; and the at least one historical value (VHISTORY), if at least one historical value (VHISTORY) has been obtained from said second data source;

estimate, by the neural network machine learning model (115), the current value (VCURRENT) of the intangible asset based on the identified future value (VFUTURE) for a pre-set time period (T), wherein the estimated current value (VCURRENT) is fed back into the neural network machine learning model to further iteratively train the neural network machine learning model and improve the future value identified by the neural network machine learning model;

send instructions to a primary market on a trading platform, wherein the instruction are to offer the intangible asset or defined fraction thereof for sale at a price that is set by the current value (VCURRENT); and execute, at the primary market, a sale of the intangible asset or defined fraction thereof to a third party at the price set by the current value (VCURRENT).

2. The system (100) of claim 1, wherein the processor (110) is further configured to estimate a current value for a defined fraction of the intangible asset, by dividing the estimated current value (VCURRENT) of the intangible asset by a preset number of fractions.

3. The system (100) of claim 1, wherein each of said at least one first data source (160) is a social media source.

4. The system (100) of claim 1, wherein the processor (110) is further configured to obtain a pre-set time period (T) for which a future value (VFUTURE) of the intangible asset is to be identified.

5. The system (100) of claim 2, further comprising a second interface (130), wherein the processor (110) is further configured to: send at least one of the estimated current value (VCURRENT) of the intangible asset, and the estimated current value for a defined fraction of the intangible asset, to one or more user devices (1501 . . . n) via the second interface (130).

6. The system (100) according to claim 1, wherein the neural network machine learning model (115) is further configured to identify one or more non-linear relationship between one or more evaluation parameter (PEVAL) and at least one class C to which the source file has been classified to belong, and to base the estimation of the current value (VCURRENT) of the intangible asset at least partly on the one or more identified non-linear relationship.

7. The system (100) according to claim 1, wherein the processor (110) is configured to obtain, via the first interface (120), two or more evaluation parameters (PEVAL) from at least one first data source (160), and wherein the neural network machine learning model (115) is further configured to identify one or more non-linear relationship between two or more of the one or more evaluation parameters (PEVAL) and to base the estimation of the current value (VCURRENT) of the intangible asset at least partly on the one or more identified non-linear relationship.

8. The system (100) according to claim 1, wherein the neural network machine learning model is further configured to apply a weight to one or more of the selected at least one class (C), the one or more evaluation parameters (PEVAL) obtained from the first data source, and the at least one historical value (VHISTORY); and, in the case a weight has been applied, identifying the future value (VFUTURE) of the intangible asset based on the weighted at least one selected class (C), the weighted one or more evaluation parameters (PEVAL) obtained from the first data source, and the weighted at least one historical value (VHISTORY).

9. The system according to claim 1, wherein at least one characteristic of the digital representation of the intangible asset comprises a digital fingerprint of the digital representation.

10. A computer-implemented method for estimating a current value (VCURRENT) using a digital representation of an intangible asset, the intangible asset being a piece of music, a game, a film, a piece of computer code or a piece of visual art, the method comprising:

obtaining, by the processor, a source file with the digital representation of the intangible asset;

analyzing, by the processor, the digital representation to identify at least one characteristic of the digital representation, wherein the at least one characteristic comprises a data pattern;

classifying, by the processor, the digital representation to belong to at least one class (C), from a set (SETc) of predetermined classes, based on the identified at least one characteristic of the digital representation; obtaining, by the processor, one or more evaluation parameters (PEVAL) associated with the creator of the intangible asset from at least one first data source, wherein each of said at least one first data source is a social media source;

checking, by the processor, if there exists one or more historical value (VHISTORY), wherein the one or more historical values (VHISTORY) comprise one or more previously estimated current values (VCURRENT) or one or more previously estimated market values (VMARKET) associated with the intangible asset in a second data source (180); and, obtaining, by the processor, at least one of said one or more historical values associated with the intangible asset from said second data source;

iteratively train a neural network machine learning model based on the one or more historical values (VHISTORY);

applying the neural network machine learning model to identify a future value (VFUTURE) of the intangible asset based on at least: the selected at least one class (C); the one or more evaluation parameters (PEVAL) obtained from the first data source; and the at least one historical value (VHISTORY), if at least one historical value (VHISTORY) has been obtained from said second data source;

applying the neural network machine learning model to estimate the current value (VCURRENT) of the intangible asset based on the identified future value (VFUTURE) for a pre-set time period (T), wherein the estimated current value (VCURRENT) is fed back into the neural network machine learning model to further iteratively train the neural network machine learning model and improve the future value identified by the neural network machine learning model;

sending instructions to a primary market on a trading platform, wherein the instruction are to offer the intangible asset or defined fraction thereof for sale at a price that is set by the current value (VCURRENT); and executing, at the primary market, a sale of the intangible asset or defined fraction thereof to a third party at the price set by the current value (VCURRENT).

11. The computer-implemented method of claim 10, further comprising estimating a current value for a defined fraction of the intangible asset, by dividing the estimated current value (VCURRENT) by a preset number of fractions.

12. The computer-implemented method of claim 11, further comprising sending, by the processor, the estimated current value (VCURRENT) of the intangible asset, or the estimated current value for a defined fraction of the intangible asset, to one or more user device.

13. A non-transitory processor-readable storage medium, having a program recorded thereon for estimating a current value (VCURRENT) using a digital representation of an intangible asset, the intangible asset being a piece of music, a game, a film, a piece of computer code or a piece of visual art, the program comprising:
- algorithm for obtaining a source file with the digital representation of the intangible asset;
- algorithm for analyzing the digital representation to identify at least one characteristic of the digital representation, wherein the at least one characteristic comprises a data pattern;
- algorithm for classifying the digital representation to belong to at least one class (C), from a set (SETc) of predetermined classes, based on the identified at least one characteristic of the digital representation;
- algorithm for obtaining one or more evaluation parameters (PEVAL) associated with the creator of the intangible asset from at least one first data source, wherein each of said at least one first data source is a social media source;
- algorithm for checking if there exists one or more historical value (VHISTORY), wherein the one or more historical values (VHISTORY) comprise one or more previously estimated current value (VCURRENT) or one or more previously estimated market values (VMARKET) associated with the intangible asset in a second data source; and, obtaining at least one of said one or more historical values (VHISTORY) associated with the intangible asset from said second data source (180);
- algorithm for iteratively training a neural network machine learning model based on the one or more historical values (VHISTORY);
- algorithm for applying the neural network machine learning model to identify a future value (VFUTURE) of the intangible asset based on at least: the selected at least one class (C); the one or more evaluation parameter (PEVAL) obtained from the first data source; and the at least one historical value (VHISTORY), if at least one historical value (VHISTORY) has been obtained from said second data source; algorithm for applying the neural network machine learning model to estimate the current value (VCURRENT) of the intangible asset based on the identified future value (VFUTURE) for a pre-set time period (T), wherein the estimated current value (VCURRENT) is fed back into the neural network machine learning model to further iteratively train the neural network machine learning model and improve the future value identified by the neural network machine learning model;
- algorithm for sending instructions to a primary market on a trading platform, wherein the instruction are to offer the intangible asset or defined fraction thereof for sale at a price that is set by the current value (VCURRENT); and algorithm for executing, at the primary market, a sale of the intangible asset or defined fraction thereof to a third party at the price set by the current value (VCURRENT).

* * * * *